United States Patent
Eroglu et al.

(10) Patent No.: US 7,934,381 B2
(45) Date of Patent: May 3, 2011

(54) FUEL LANCE FOR A GAS TURBINE INSTALLATION AND A METHOD FOR OPERATING A FUEL LANCE

(75) Inventors: Adnan Eroglu, Untersiggenthal (CH); Felix Guethe, Basel (CH); Urs Benz, Gipf-Oberfrick (CH)

(73) Assignee: Alstom Technology Ltd., Baden (CH)

( * ) Notice: Subject to any disclaimer, the term of this patent is extended or adjusted under 35 U.S.C. 154(b) by 238 days.

(21) Appl. No.: 12/240,268

(22) Filed: Sep. 29, 2008

(65) Prior Publication Data

US 2009/0044539 A1 Feb. 19, 2009

Related U.S. Application Data

(63) Continuation of application No. PCT/EP2007/052173, filed on Mar. 8, 2007.

(30) Foreign Application Priority Data

Mar. 31, 2006 (CH) .................................. 0533/06

(51) Int. Cl.
*F02C 1/00* (2006.01)
*F02G 3/00* (2006.01)

(52) U.S. Cl. ........... 60/740; 60/742; 60/39.465; 60/737; 60/39.463

(58) Field of Classification Search .................... 60/739, 60/740, 742, 746, 747, 39.463, 39.465, 39.17, 60/737

See application file for complete search history.

(56) References Cited

U.S. PATENT DOCUMENTS

| | | |
|---|---|---|
| 5,487,659 A | 1/1996 | Eroglu et al. |
| 5,615,555 A | 4/1997 | Mina |
| 5,617,718 A | 4/1997 | Althaus |
| 5,836,163 A * | 11/1998 | Lockyer et al. ................. 60/737 |
| 7,395,670 B1 * | 7/2008 | Drnevich et al. ............... 60/780 |
| 7,584,599 B2 * | 9/2009 | Benz et al. .................... 60/39.17 |
| 7,739,864 B2 * | 6/2010 | Finkenrath et al. .......... 60/39.52 |

FOREIGN PATENT DOCUMENTS

| | | |
|---|---|---|
| CA | 1054042 A | 5/1979 |
| EP | 0638769 A2 | 2/1995 |
| EP | 1243854 A1 | 9/2002 |
| FR | 2328921 A | 5/1977 |
| FR | 2461816 A | 2/1981 |
| GB | 2176274 A | 12/1986 |

* cited by examiner

*Primary Examiner* — William H Rodríguez
*(74) Attorney, Agent, or Firm* — Volpe and Koenig, P.C.

(57) ABSTRACT

A fuel lance for a gas turbine installation with sequential combustion, in which hot gas is produced in a first combustion chamber and expanded in a subsequent turbine, and then flows through a subsequent second combustion chamber in which the fuel lance for injecting fuel into the hot gas is arranged. The fuel lance has a lance section which extends in the flow direction of the hot gas and includes at least an outer tube which is arranged concentrically to a lance axis, and a center tube which is concentrically arranged in the outer tube and in which the fuel is guided to the lance tip and is injected through first injection openings in the region of the lance tip into the hot gas. The fuel lance is modified for operation with syngas by the first injection openings being arranged directly on the lance tip, and by the first injection openings being oriented so that the fuel jets which emerge from them include an acute angle with the lance axis.

16 Claims, 4 Drawing Sheets

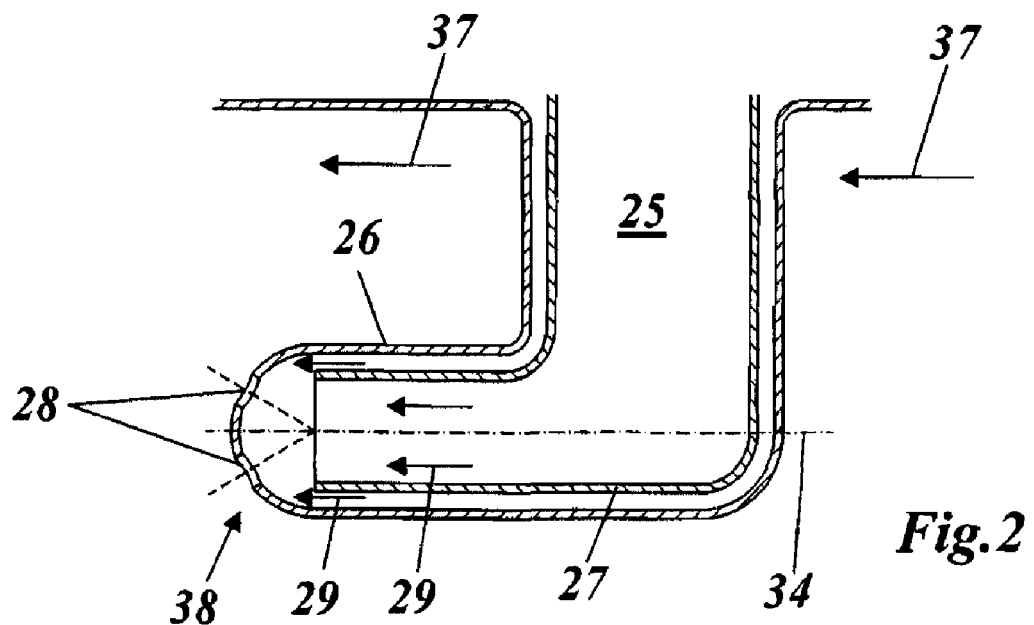
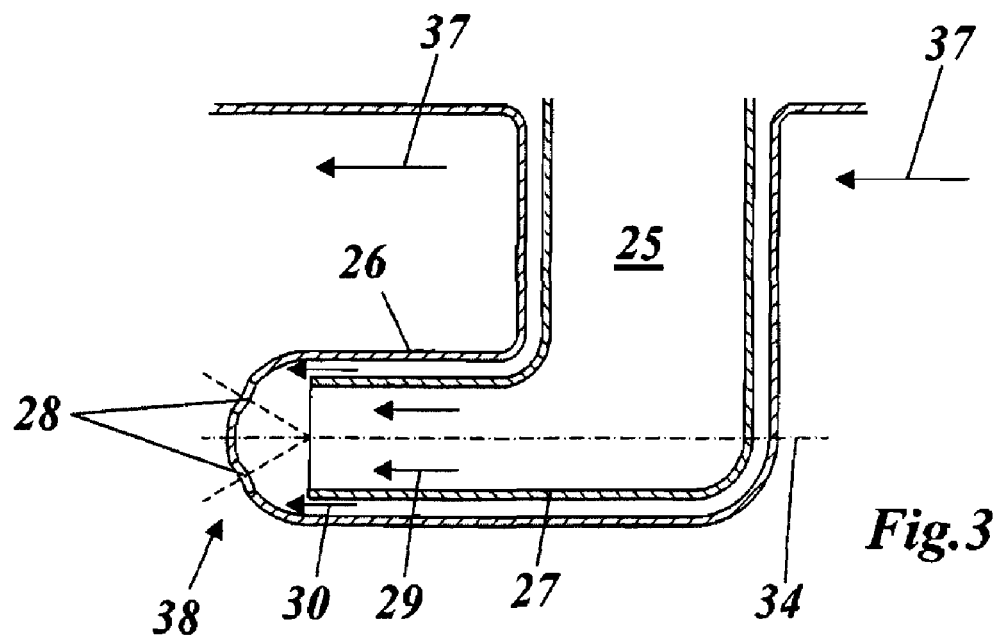

US 7,934,381 B2

FUEL LANCE FOR A GAS TURBINE INSTALLATION AND A METHOD FOR OPERATING A FUEL LANCE

CROSS REFERENCE TO RELATED APPLICATIONS

This application is a continuation of International Application No. PCT/EP2007/052173 filed Mar, 8, 2007, which claims priority to Swiss Patent Application No. 00533/06, filed Mar. 31, 2006, both of which are incorporated by reference as if fully set forth.

FIELD OF INVENTION

The present invention relates to the field of technology of gas turbine installations. It refers to a fuel lance for a gas turbine installation and also to a method for operating such a fuel lance.

BACKGROUND

Combined cycle power plants with integrated gasification (Integrated Gasification Combined Cycle IGCC) are normally operated with a synthetic combustible gas (syngas or MBtu-gas), which is produced by gasification of coal, biomass or other fuels. This fuel differs considerably from natural gas with regard to the gross calorific value, the density and the combustion characteristics, such as flame velocity and ignition delay time. In a gas turbine with sequential combustion or reheating for IGCC power plants, therefore, both in the fuel supply system and in the combustion chambers, essential adjustments are necessary in order to cope with these differences.

A gas turbine installation with reheating, with its essential component parts, is schematically reproduced in FIG. 1. The gas turbine installation 10 of FIG. 1 comprises a unit for compressing the inducted combustion air, which comprises a low-pressure compressor 11a and a high-pressure compressor 11b which is connected downstream. The compressed combustion air is fed to a first combustion chamber 12 where it is used partially for combusting a fuel which is fed via a first fuel feed 23. The resulting hot gas is expanded in a subsequent high-pressure turbine 13, performing work, and then fed to a second combustion chamber 14 in which the unused air portion is used for combusting a fuel which is fed via a second fuel feed 23. The hot gas which comes from the second combustion chamber 14 is expanded in a subsequent low-pressure turbine 15, performing work, and then directed through a heat recovery steam generator (HRSG) 21 where steam is produced for steam turbines (not shown) of a separate water-steam cycle. The exhaust gas 22 can then be directed to an exhaust stack. The two turbines 13 and 15 are connected via a shaft 20 to the compressors 11a, b and to a generator 16 for electric power, and drive this. Compressed air for cooling purposes can be tapped from the compressors 11a and 11b, cooled down in corresponding high-pressure or low-pressure once-through coolers (OTC) 18 and 19, and then directed to the combustion chambers 23, 24 or to the turbines 13, 15 for cooling. A comparable gas turbine installation is disclosed for example in U.S. Pat. No. 5,617,718.

In the second combustion chamber of the sequential combustion the fuel is injected into the hot gas flow by a fuel lance, the shape of which is indicated in FIG. 2 of U.S. Pat. No. 5,617,718, and the construction of which is shown in detail for example in EP-A2-0 638 769. If different types of syngas are compared with natural gas, it becomes apparent that for the syngas, depending upon type and source, a larger flow cross section is required, which can be larger by the factor of 3 to 9 than the flow cross section for natural gas. At present, it is a great challenge to inject the large volumetric flows which are associated with it in the case of syngas through the fuel lance into the combustion chamber. It is theoretically possible to increase the lance diameter in order to create the necessary additional space. This, however, would have a significant influence on the aerodynamics of the burner and would entail a new construction of the combustion chamber and of the casing of the gas turbine. It is therefore desirable to keep the outside diameter of the fuel lance at the transition from natural gas to syngas constant. On the other hand, some modifications are necessary in order to reduce the residence time of the syngas inside the mixing zone of the burner and so to avoid a flashback.

SUMMARY

The invention provides a fuel lance and a method for its operation which, without significant modifications in the outside dimensions, enable the use of syngas as fuel in the second combustion stage of a gas turbine with sequential combustion.

This is achieved according to the invention in that the first injection openings are arranged directly on the lance tip, and that the first injection openings are oriented so that the fuel jets which emerge from them form an acute angle with the lance axis. As a result of the displacement of the injection openings in the flow direction of the hot gas towards the tip of the lance, and as a result of the inclined position or tilting of the injected fuel jets in the flow direction, the residence time of the syngas in the mixing zone is reduced. The (acute) angle which the jets form with the lance axis, is a parameter which in dependence upon hydrogen content of the fuel can be optimized, wherein the greater the hydrogen content the smaller becomes the angle.

In the case of the method according to the invention for operating a fuel lance, syngas (as fuel) is guided in the center tube to the first injection openings, and injected through the first injection openings into the hot gas flow.

BRIEF DESCRIPTION OF THE DRAWINGS

The invention is subsequently to be explained in more detail based on exemplary embodiments in connection with the drawing. In the drawing

FIGS. 2 and 3 show a first exemplary embodiment of a burner lance according to the invention for the operation with syngas in the second combustion stage of a gas turbine installation according to FIG. 1, wherein in FIG. 2 syngas is exclusively injected;

DETAILED DESCRIPTION OF THE PREFERRED EMBODIMENTS

Introduction to the Embodiments

Figure 1:
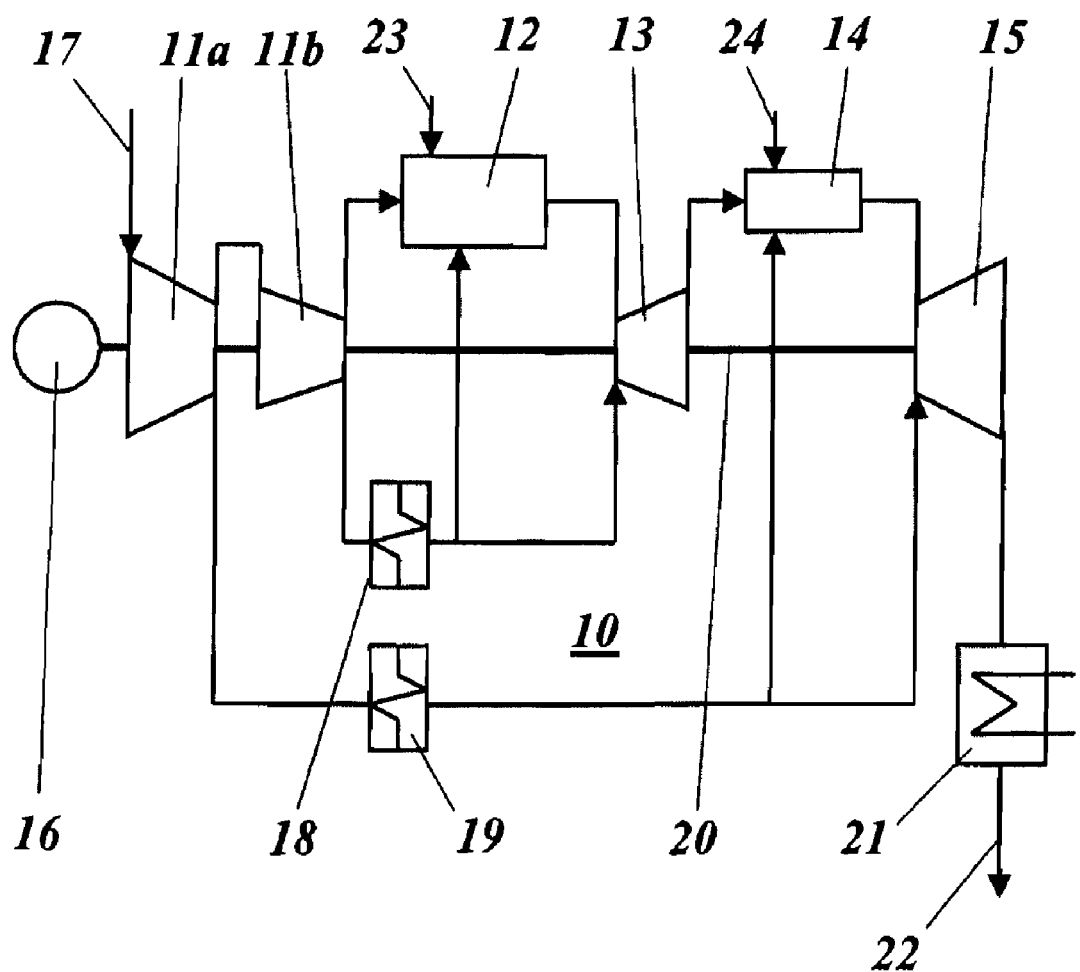
FIG. 1 shows a simplified scheme of a gas turbine installation with sequential combustion, as is known from the prior art and is suitable for realization of the invention.

According to the invention, a fuel lance is provided in which the first injection openings are arranged directly on the lance tip, and the first injection openings are oriented so that the fuel jets which emerge from them include an acute angle with the lance axis.

According to one development of the invention, the lance tip is rounded, and the first injection openings are arranged in the region of the rounding.

Another development provides that the center tube terminates at a distance from the lance tip and at the end has an opening which corresponds to the width of the tube.

A further development provides that an inner tube is concentrically arranged in the center tube, the inner tube is guided towards the lance tip, and second injection openings for injecting liquid fuel are provided on the lance tip and are supplied with the liquid fuel through the inner tube.

The first and second injection openings are preferably arranged in each case on a common radius around the lance axis, wherein the radius of the second injection openings is smaller than the radius of the first injection openings.

The second injection openings in this case can be designed for creating a fuel jet. They can also be designed, however, for creating an atomized spray.

In the case of the method according to the invention for operating a fuel lance without an inner tube, syngas (as fuel) is guided in the center tube to the first injection openings, and injected through the first injection openings into the hot gas flow.

One development of the method according to the invention provides that in a space between outer tube and center tube, syngas (as fuel) is also guided to the first injection openings and injected through the first injection openings into the hot gas flow.

Another development provides that in the space between outer tube and the center tube, a diluting medium, especially nitrogen or steam, is guided to the first injection openings and injected through the first injection openings into the hot gas flow.

A further development provides that in the space between outer tube and the center tube, air acting as a carrier or screening medium, is guided to the first injection openings and injected through the first injection openings into the hot gas flow.

In the case of the method according to the invention for operating a fuel lance with an inner tube, in the space between center tube and inner tube, syngas (as fuel) is guided to the first injection openings and injected through the first injection openings into the hot gas flow, and in the inner tube, liquid fuel, especially oil, is guided to the second injection openings and injected through the second injection openings into the hot gas flow.

One development of this method according to the invention provides that in the space between outer tube and center tube, syngas (as fuel) is also guided to the first injection openings and injected through the first injection openings into the hot gas flow.

It is also conceivable, however, that in the space between outer tube and the center tube, a diluting medium, especially nitrogen or steam, is guided to the first injection openings and injected through the first injection openings into the hot gas flow.

Furthermore, it can be advantageous if in the space between outer tube and the center tube, air acting as a carrier or screening medium, is guided to the first injection openings and injected through the first injection openings into the hot gas flow.

It is also conceivable, however, that in the space between center tube and inner tube, a mixture of natural gas and steam or nitrogen, as fuel, is guided to the first injection openings and injected through the first injection openings into the hot gas flow, and that in the inner tube, a liquid fuel, especially oil, is guided to the second injection openings and injected through the second injection openings into the hot gas flow.

In particular, in the space between outer tube and the center tube, air acting as a carrier, can be guided to the first injection openings and injected through the first injection openings into the hot gas flow.

WAYS OF IMPLEMENTING THE INVENTION

In FIGS. 2 and 3, a first exemplary embodiment of a fuel lance according to the invention is reproduced, wherein different operating modes are shown in the two figures. The fuel lance 25 of FIGS. 2 and 3 first of all projects perpendicularly into the flow of the hot gas 37, then bends at right angles and extends in the flow direction of the hot gas 37 along a lance axis 34 which lies parallel to the hot gas flow. The fuel lance 25 comprises an outer tube 26 in which a center tube 27 is concentrically arranged. The outer tube 26 is extended up to the lance tip 38 and terminates there with a rounded end section in which are arranged comparatively large injection openings 28 which are distributed around the lance axis 34 with radial spacing. The center tube 27 terminates before the lance tip 38 with an opening which corresponds to the width of the tube 27. In this way, a medium, which is introduced in the center tube 27 or in the space between outer tube 26 and center tube 27, can be injected without any problem through the injection openings 28 into the hot gas flow.

Figure 4:
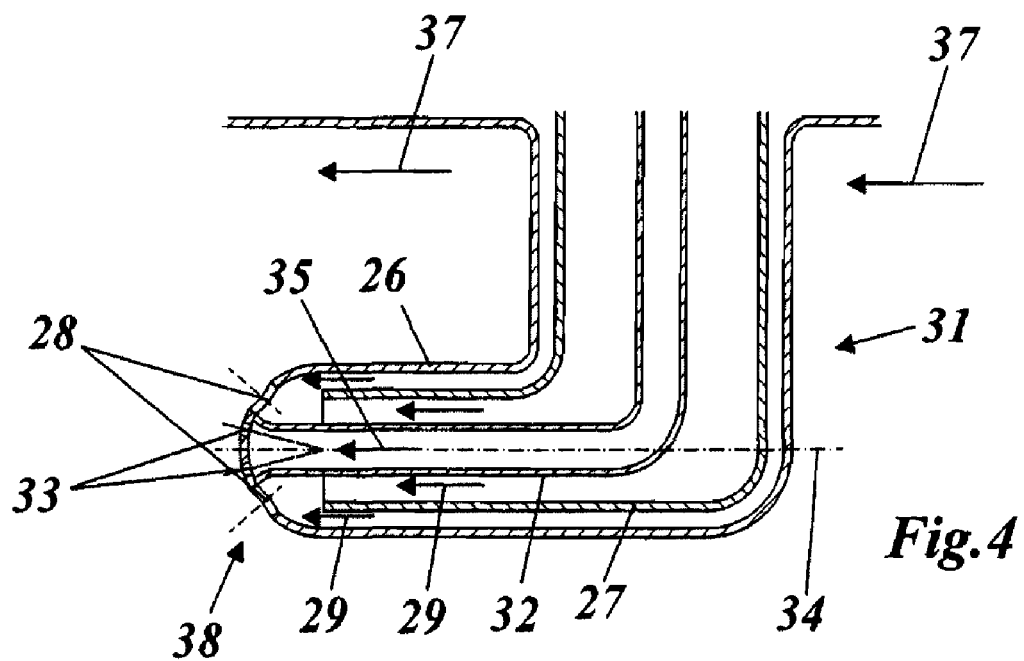
FIGS. 4 to 6 show a second exemplary embodiment of a burner lance according to the invention for use in the second combustion stage of a gas turbine installation according to FIG. 1, wherein different media are guided and injected outside the inner tube.
Figure 5:
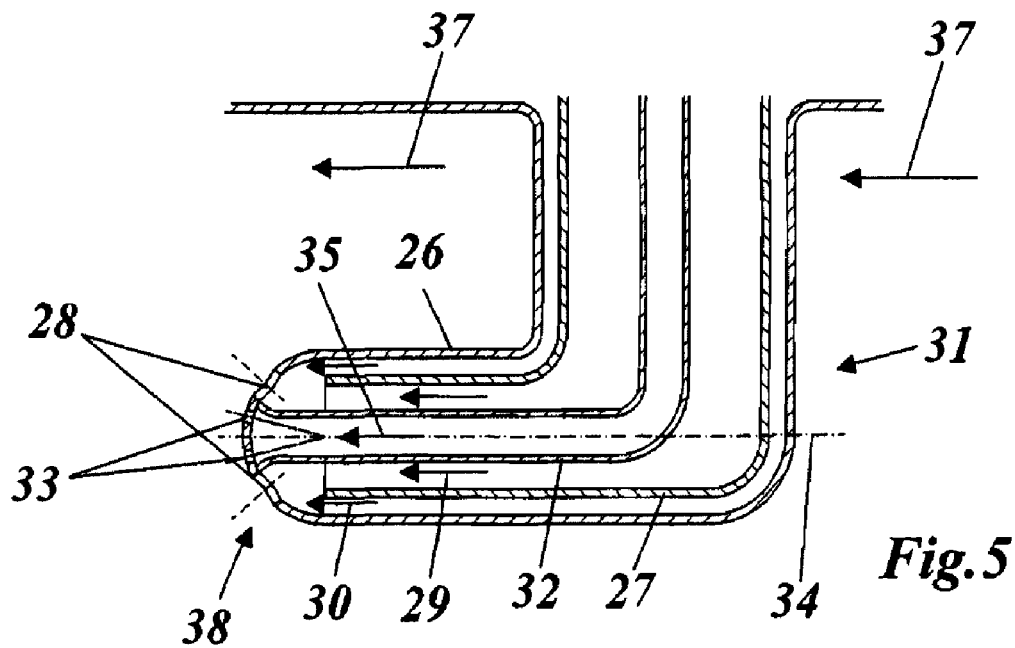
Figure 6:
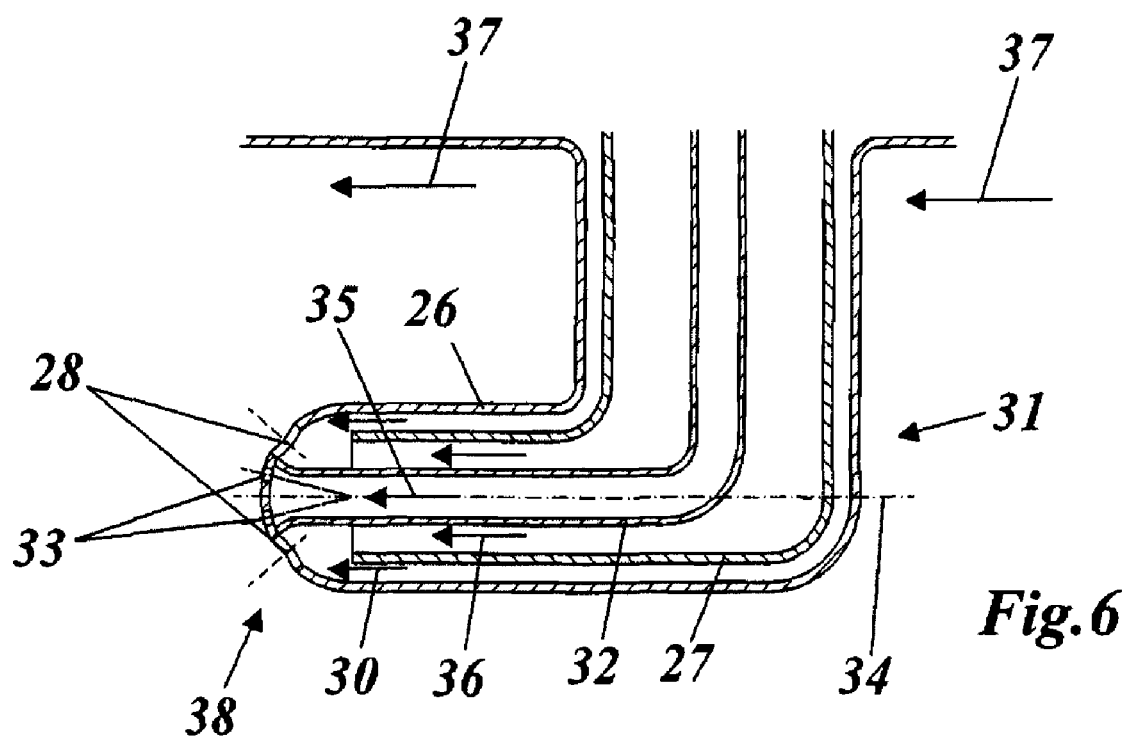

According to FIG. 2, in an especially simple development of the invention the entire space inside the fuel lance 25 is utilized for the introducing of syngas 29. An inner tube, which, as shown in FIGS. 4-6, is used for a liquid fuel, is completely removed. Similarly the space between outer tube 26 and center tube 27, which is otherwise used for the guiding of air, is also used for the transporting of syngas. Compared with the known solution from EP-A2-0 638 769, the injection openings are displaced downstream and are inclined or tilted with their jet direction (broken lines in FIGS. 2, 3) from the radial direction to the axial direction in order to reduce the residence time of the syngas in the mixing zone. The (acute) angle, which the jets form with the lance axis 34, is a parameter which in dependence upon hydrogen content of the fuel can be optimized, wherein the greater the hydrogen content the smaller the angle can become.

The following advantages consequently result:
the maximum flow cross section for the syngas is made available; and
a minimized pressure drop is created for the gas injection;
The operation, however, is limited to the one fuel, specifically syngas.

In a variation to the operating mode which is shown in FIG. 2, the space between the outer tube 26 and the center tube 27 is used for feeding a diluting medium in the form of nitrogen or steam. Alternatively to this, according to FIG. 3 the space can be reserved for the feed of air 30 as a carrier or screening flow. Both the dilution and the screening in this case helps to improve the combustion behavior by a better mixing through being achieved before ignition so that the NOx emissions and the risk of a flashback are reduced.

It is also conceivable, however, according to FIG. 4, to use a fuel lance 31 in which an inner tube 32 is concentrically arranged inside the center tube 27 and through which liquid fuel in the form of oil 35 is guided to the lance tip 38 and injected there through separate injection openings 33. The injecting of oil is carried out in the center of the lance tip 38. According to FIG. 4, syngas is guided in the spaces between outer tube 26 and center tube 27, and between center tube 27 and inner tube 32. According to FIG. 5, the space between outer tube 26 and center tube 27 is used for either transporting a diluting medium (steam of nitrogen) or, as drawn-in in FIG. 5, for transporting air 30 as a carrier or screening flow. The injection openings 33 for the oil 35 can be formed either for creating fuel jets or for creating an atomized spray. Although as a result of the introduction of the inner tube 32 the space for the syngas is slightly limited, the possibility thus arises of using back-up fuel.

Finally, it is also conceivable to use natural gas with the fuel lance according to FIGS. 4-5 instead of the syngas. Due to the large injection openings 28, the flow velocity for natural gas which can be achieved as a result is inherently too low, an operation with natural gas can be enabled by a gas mixture 36 being produced by dilution of the natural gas with steam or nitrogen and injected instead of the syngas (FIG. 6). In this way, the injection velocity of the natural gas can be increased in order to achieve a better penetration and mixing. Furthermore, the addition of diluting media, such as steam or nitrogen, decelerates the combustion chemistry and accordingly helps to achieve a better mixing of fuel and air, and as a result towards an improved emissions characteristic.

Altogether, the following advantages are created by the invention:
- a simple solution which can be realized in retrofit for use of syngas in the case of a sequential combustion in a gas turbine:
- a maximum flow cross section and minimum pressure drop, if the inner tube is dispensed with; and
- an optimum possibility for back-up fuel.

LIST OF DESIGNATIONS

10 Gas turbine installation
11a Low-pressure compressor
11b High-pressure compressor
12, 14 Combustion chamber
13 High-pressure turbine
15 Low-pressure turbine
16 Generator
17 Air inlet
18 High-pressure once-through cooler
19 Low-pressure once-through cooler
20 Shaft
21 Heat recovery steam generator
22 Exhaust gas
23, 24 Fuel feed
25, 31 Fuel lance
26 Outer tube
27 Center tube
28, 33 Injection opening
29 Syngas
30 Air
32 Inner tube
34 Lance axis
35 Oil
36 Gas mixture
37 Hot gas
38 Lance tip

* * *

What is claimed is:

1. A fuel lance for a gas turbine installation with sequential combustion, in which hot gas is produced in a first combustion chamber and expanded in a subsequent turbine, and then flows through a subsequent second combustion chamber in which the fuel lance is arranged for injecting fuel into the hot gas, the fuel lance comprises a lance section which extends in a flow direction of the hot gas and includes at least an outer tube which is arranged concentrically to a lance axis, and a center tube which is concentrically arranged in the outer tube and in which the fuel is guided to a lance tip to be injected from a region of the lance tip through first injection openings on the lance tip into the hot gas, the center tube terminates at a distance from the lance tip and includes an opening at an end thereof which corresponds to a width of the center tube, a chamber is defined between the opening of the center tube and the lance tip, the chamber is delimited by the opening of the center tube and outer tube, the first injection openings are oriented so that the fuel jets which emerge from them form an acute angle with the lance axis.

2. The fuel lance as claimed in claim 1, wherein the lance tip is rounded, and the first injection openings are arranged in a region of the rounding.

3. A fuel lance for a gas turbine installation with sequential combustion, in which hot gas is produced in a first combustion chamber and expanded in a subsequent turbine, and then flows through a subsequent second combustion chamber in which the fuel lance is arranged for injecting fuel into the hot gas, the fuel lance comprises a lance section which extends in a flow direction of the hot gas and includes at least an outer tube which is arranged concentrically to a lance axis, and a center tube which is concentrically arranged in the outer tube and in which the fuel is guided to a lance tip to be injected from a region of the lance tip through first injection openings on the lance tip into the hot gas, the first injection openings are oriented so that the fuel jets which emerge from them form an acute angle with the lance axis, wherein an inner tube is concentrically arranged in the center tube, the inner tube is guided towards the lance tip, and second injection openings for injecting liquid fuel supplied through the inner tube are provided on the lance tip.

4. The fuel lance as claimed in claim 3, wherein the first and second injection openings are arranged in each case on a common radius around the lance axis, and a radius around which the second injection openings are arranged is smaller than a radius around which the first injection openings are arranged.

5. The fuel lance as claimed in 3, wherein the second injection openings are adapted to create a fuel jet.

6. The fuel lance as claimed in claim 3, wherein the second injection openings are adapted to create an atomized spray.

7. A method for operating a fuel lance for a gas turbine installation with sequential combustion, in which hot gas is produced in a first combustion chamber and expanded in a subsequent turbine, and then flows through a subsequent second combustion chamber in which the fuel lance is arranged for injecting fuel into the hot gas, the method comprising:
providing the fuel lance having a lance section which extends in a flow direction of the hot gas and includes at least an outer tube which is arranged concentrically to a lance axis, and a center tube which is concentrically arranged in the outer tube and in which the fuel is guided to a lance tip to be injected from a region of the lance tip through first injection openings on the lance tip into the hot gas, the center tube terminates at a distance from the lance tip and includes an opening at an end thereof which corresponds to a width of the center tube, a chamber is defined between the opening of the center tube and the lance tip, the chamber is delimited by the opening of the center tube and outer tube, the first injection openings are oriented so that the fuel jets which emerge from them form an acute angle with the lance axis;

guiding syngas, as fuel, through the center tube and to the first injection openings and injecting the syngas through the first injection openings into the hot gas flow.

8. The method as claimed in claim 7, further comprising also guiding the syngas in the space between outer tube and center tube to the first injection openings and injecting the syngas through the first injection openings into the hot gas flow.

9. A method for operating a fuel lance for a gas turbine installation with sequential combustion, in which hot gas is produced in a first combustion chamber and expanded in a subsequent turbine, and then flows through a subsequent second combustion chamber in which the fuel lance is arranged for injecting fuel into the hot gas, the method comprising:
 providing the fuel lance having a lance section which extends in a flow direction of the hot gas and includes at least an outer tube which is arranged concentrically to a lance axis, and a center tube which is concentrically arranged in the outer tube and in which the fuel is guided to a lance tip to be injected from a region of the lance tip through first injection openings on the lance tip into the hot gas, the first injection openings are oriented so that the fuel jets which emerge from them form an acute angle with the lance axis;
 guiding syngas, as fuel, through the center tube and to the first injection openings and injecting the syngas through the first injection openings into the hot gas flow, and
 guiding a diluting medium in the space between outer tube and the center tube to the first injection openings and injecting the diluting medium through the first injection openings into the hot gas flow.

10. A method for operating a fuel lance for a gas turbine installation with sequential combustion, in which hot gas is produced in a first combustion chamber and expanded in a subsequent turbine, and then flows through a subsequent second combustion chamber in which the fuel lance is arranged for injecting fuel into the hot gas, the method comprising:
 providing the fuel lance having a lance section which extends in a flow direction of the hot gas and includes at least an outer tube which is arranged concentrically to a lance axis, and a center tube which is concentrically arranged in the outer tube and in which the fuel is guided to a lance tip to be injected from a region of the lance tip through first injection openings on the lance tip into the hot gas, the center tube terminates at a distance from the lance tip and includes an opening at an end thereof which corresponds to a width of the center tube, the first injection openings are oriented so that the fuel jets which emerge from them form an acute angle with the lance axis;
 guiding syngas, as fuel, through the center tube and to the first injection openings and injecting the syngas through the first injection openings into the hot gas flow; and
 guiding air that acts as a carrier or screening medium in the space between outer tube and the center tube to the first injection openings and injecting the air through the first injection openings into the hot gas flow.

11. A method for operating a fuel lance for a gas turbine installation with sequential combustion, in which hot gas is produced in a first combustion chamber and expanded in a subsequent turbine, and then flows through a subsequent second combustion chamber in which the fuel lance is arranged for injecting fuel into the hot gas, the method comprising:
 providing the fuel lance having a lance section which extends in a flow direction of the hot gas and includes at least an outer tube which is arranged concentrically to a lance axis, and a center tube which is concentrically arranged in the outer tube and in which the fuel is guided to a lance tip to be injected from a region of the lance tip through first injection openings on the lance tip into the hot gas, the first injection openings are oriented so that the fuel jets which emerge from them form an acute angle with the lance axis;
 guiding syngas, as fuel, through the center tube and to the first injection openings and injecting the syngas through the first injection openings into the hot gas flow;
 providing an inner tube concentrically arranged in the center tube, the inner tube is guided towards the lance tip, and second injection openings for injecting liquid fuel supplied through the inner tube are provided on the lance tip;
 guiding the syngas in the space between center tube and inner tube syngas to the first injection openings and injecting the syngas through the first injection openings into the hot gas flow; and
 guiding a liquid fuel in the inner tube to the second injection openings and injecting the liquid fuel through the second injection openings into the hot gas flow.

12. The method as claimed in claim 11, further comprising guiding syngas in the space between outer tube and center tube to the first injection openings and injecting the syngas through the first injection openings into the hot gas flow.

13. The method as claimed in claim 11, further comprising guiding a diluting medium in the space between outer tube and the center tube to the first injection openings and injecting the diluting medium through the first injection openings into the hot gas flow.

14. The method as claimed in claim 11, further comprising air as a carrier or a screening medium in the space between outer tube and the center tube to the first injection openings and injecting the air through the first injection openings into the hot gas flow.

15. The method for operating a fuel lance for a gas turbine installation with sequential combustion, in which hot gas is produced in a first combustion chamber and expanded in a subsequent turbine, and then flows through a subsequent second combustion chamber in which the fuel lance is arranged for injecting fuel into the hot gas, the method comprising:
 providing the fuel lance having a lance section which extends in a flow direction of the hot gas and includes at least an outer tube which is arranged concentrically to a lance axis, and a center tube which is concentrically arranged in the outer tube and in which the fuel is guided to a lance tip to be injected from a region of the lance tip through first injection openings on the lance tip into the hot gas, the first injection openings are oriented so that the fuel jets which emerge from them form an acute angle with the lance axis, and an inner tube concentrically arranged in the center tube, the inner tube is guided towards the lance tip, and second injection openings for injecting liquid fuel supplied through the inner tube are provided on the lance tip;
 guiding a gas mixture consisting of natural gas and steam or nitrogen, as fuel, in the space between center tube and inner tube to the first injection openings and injecting the fuel through the first injection openings into the hot gas flow; and
 guiding a liquid fuel in the inner tube to the second injection openings and injecting the liquid fuel through the second injection openings into the hot gas flow.

16. The method as claimed in claim 15, further comprising guiding air as a carrier in the space between outer tube and the center tube to the first injection openings and injecting air through the first injection openings into the hot gas flow.

* * * * *